March 21, 1939. H. C. STEPHENS 2,151,644
METHOD AND MEANS FOR DEAERATING LIQUID FOOD PRODUCTS
Original Filed April 13, 1936 3 Sheets-Sheet 1
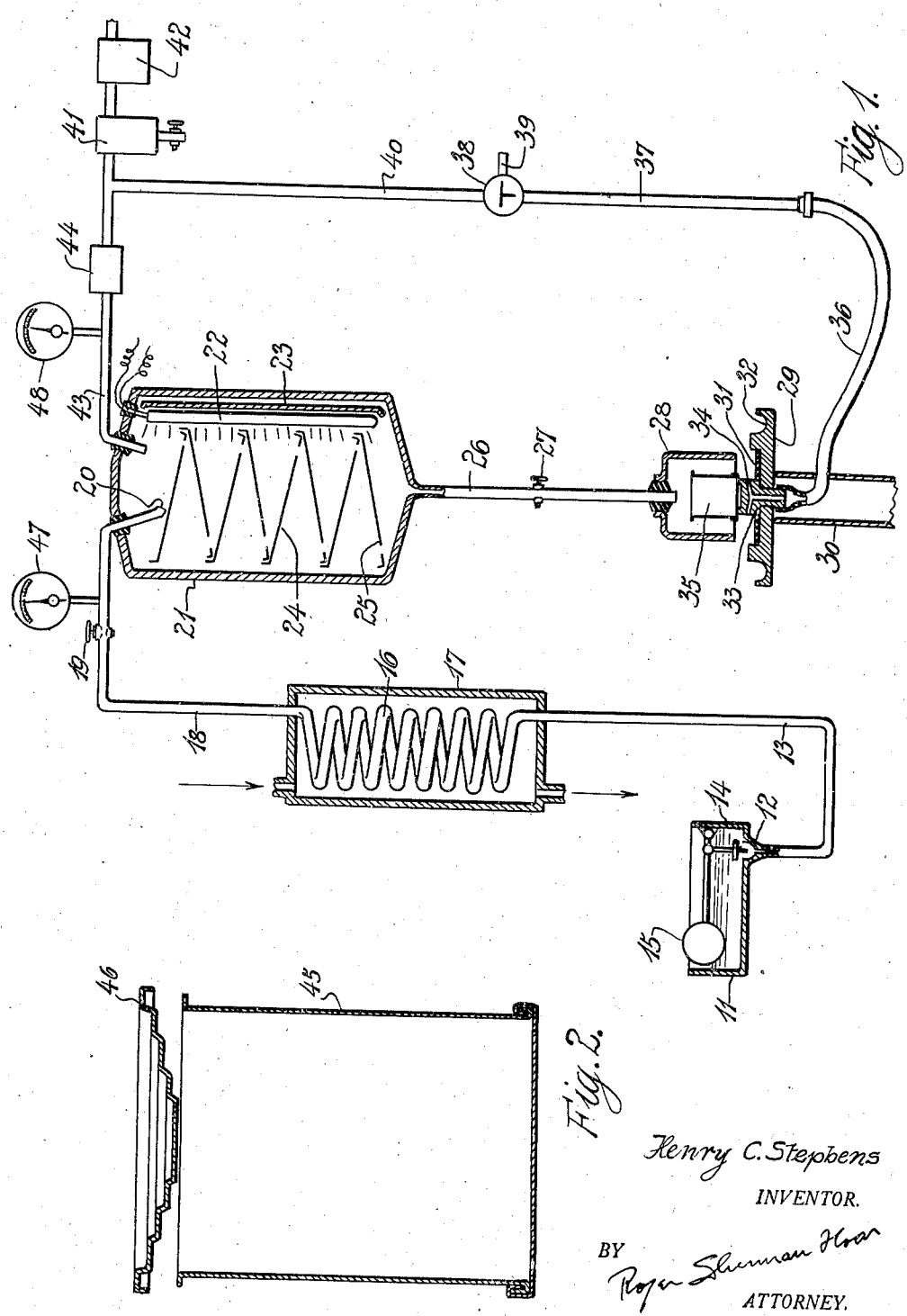
Henry C. Stephens
INVENTOR.
BY Roger Sherman Hoar
ATTORNEY.

March 21, 1939.  H. C. STEPHENS  2,151,644
METHOD AND MEANS FOR DEAERATING LIQUID FOOD PRODUCTS
Original Filed April 13, 1936  3 Sheets-Sheet 2

Henry C. Stephens.
INVENTOR.

BY Roger Sherman Hoar
ATTORNEY.

Patented Mar. 21, 1939

2,151,644

UNITED STATES PATENT OFFICE 2,151,644

METHOD AND MEANS FOR DEAERATING LIQUID FOOD PRODUCTS

Henry C. Stephens, Orange, Calif., assignor to Natural Food Products Company, Orange, Calif., a corporation of Delaware Application April 13, 1936, Serial No. 74,173
Renewed September 30, 1938

14 Claims. (Cl. 99—155)

My invention relates to new and useful improvements in method and means for deaerating liquid food products.

This present application is a continuation-in-part, as to all common subject-matter, of my copending application of the same title, Serial No. 619,022, filed June 24, 1932. This present application amplifies some of the details of that parent case, and supports some of them by amplified showings.

The object of my invention is to process and pack liquid food products of all kinds in such a way as to preserve their natural color, bouquet, flavor, and vitamin content, and at the same time to eliminate the detinning action on the inside of ordinary unlacquered coke-tin-plated tin cans that usually occurs in products canned under ordinary canning methods today.

I have found that oxygen present either in air in the head space above the product inside the container, or in air dissolved or occluded in the product itself, whether in tin cans or even in glass containers, is the chief cause of loss of color, bouquet, flavor, and vitamin content, as well as being the chief cause of the detinning action inside of the cans. I have further found that the application of heat, in pasteurization, to products thus exposed to, or thus containing, oxygen, accentuates the above-mentioned detrimental effects upon the product and upon the container.

Accordingly not only does it become necessary to remove all dissolved, occluded and surface air from both product and container before sealing, and to permit the return of none before sealing; but also it becomes highly advisable that this removal shall take place before pasteurization.

The ordinary methods of vacuum filling and/or vacuum sealing are not sufficient to remove the dissolved and occluded air from liquids, for the reason that the suction of even a high vacuum is insufficient to remove such air from more than a few millimeters below the surface exposed to the vacuum. I have found that it is necessary to so agitate and/or so spread the liquid to be deaerated that every part of it shall receive surface exposure to a high vacuum.

On the other hand, I have found that air readily returns into deaerated products, unless special precautions be taken, and that any agitation of the liquid during exposure to air after deaeration accelerates such re-entry.

I have also found, contrary to former beliefs, that complete deaeration of liquid food products can actually be accomplished by the use of commercially attainable vacua, and without the substitution of any other gas. However, if the critical vacuum for any given temperature of the liquid be exceeded appreciably, it will cause loss of volatiles, and will even carry the liquid across the boiling pressure for that temperature, thus causing deleterious cooking and loss of liquid constituents. This is a serious danger, due to the fluctuations in pressure which are bound to result from the inevitable fluctuations in flow of juice both into and out of the system, and is a practically inescapable danger in batch operation. The available pressure range, for each temperature, increases in width as the temperature is reduced, and accordingly it is highly desirable to precool the liquid, as the first step of my process, so as to bring it into the wider ranges; but, of course, not down to the freezing-point. As a practical matter, it is desirable to cool it to below 70° F. 60° is sufficient, although 50° is even preferable. At any practical temperatures, 1" Hg pressure is an upper limit which ought not to be exceeded.

Based upon these observations and considerations, and for the purpose of attaining these advantages, I have devised the process and apparatus which form the subject-matter of this present patent.

The apparatus set forth herein, in addition to being a novel combination, also contains elements which per se have many novel details: the inventive features thereof being in part of my own devising, in part the work of my associate Stedman B. Hoar, and in part due to us both jointly. These inventive features are the subjects-matter of copending applications, as will be hereinafter specified as the description progresses.

One embodiment of an apparatus capable of performing my process on citrus juices, and other similar liquids, is exemplified in the accompanying drawings which are hereinafter particularly described and explained.

Throughout the description, the same reference number is applied to the same or to similar members.

Figure 1 is an elevation, largely conventionalized, and partly in section, of the apparatus just referred to.

Figure 2 is a vertical section of a tin can, and its cover, especially adapted to be used with my process. Figure 2 is drawn to a very much more open scale than Figure 1.

Figure 3:
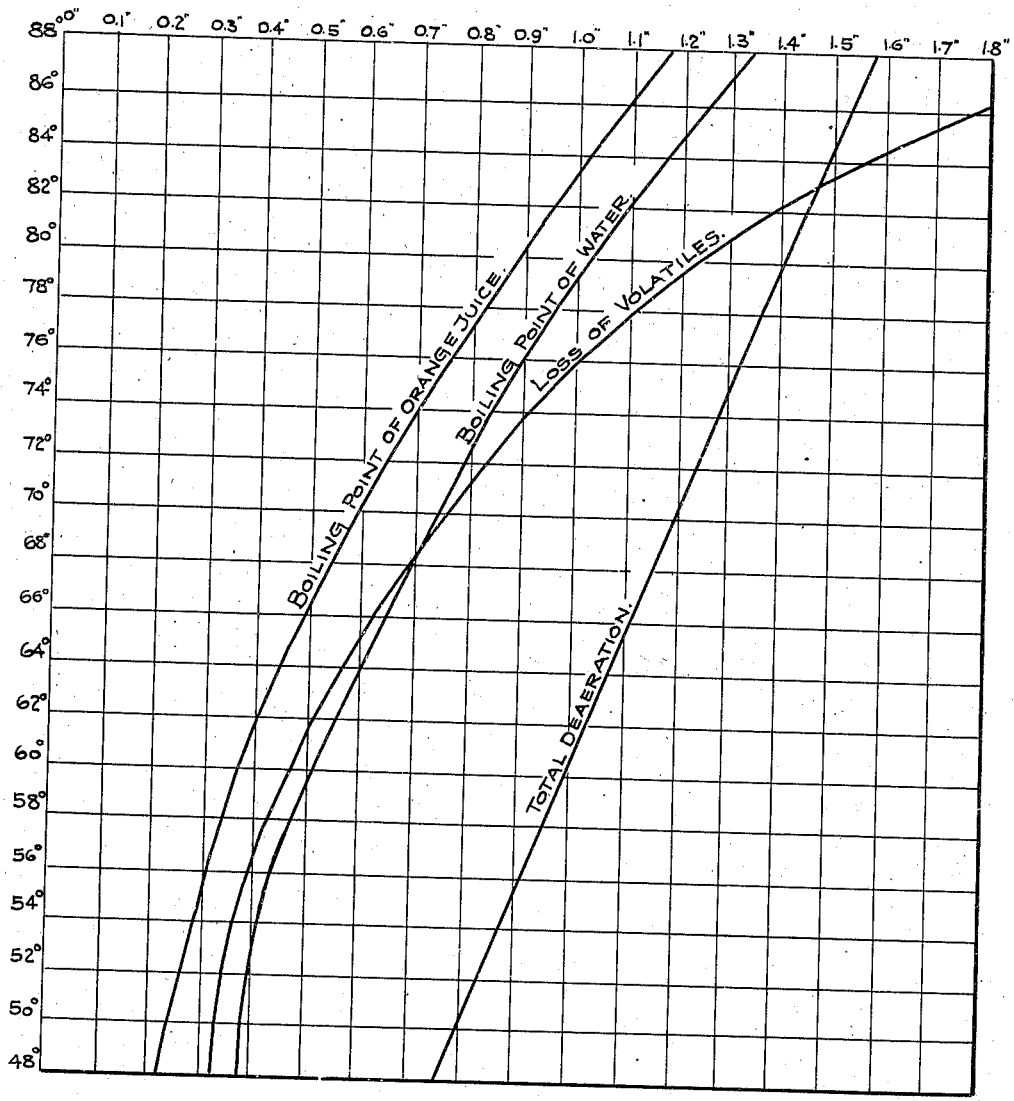
Figures 3 and 4 are charts, which will be more particularly described hereinafter.

Referring to the drawings, it will be seen that 11 is a reservoir to receive the liquid. In the bottom of this reservoir is an outlet 12, leading to a pipe 13. This outlet is closed by a valve 14, actuated by a float 15.

The pipe 13 leads upward to a coil 16 within a cooling chamber 17, through which cold water, or brine, or other cooling medium is circulated in any convenient manner. The importance of having the liquid pass upwardly through the cooling coil lies in the fact that this keeps the coil always full of liquid, and thus ensures maximum efficiency.

Thence the pipe 18, with cock 19, leads to a spray nozzle 20, within a deaerating tank 21. Within the tank there is also an ultra-violet lamp 22 and an aluminum reflector 23. This lamp serves to add vitamin D to the product. Also to increase shelf-life.

The liquid, after leaving the nozzle 20, slides at first as a lather and then in a thin film successively down the upper surfaces of vanes 24, dropping through holes 25 near the bottom of each vane onto the top of the succeeding vane. The top, bottom and side edges of each vane are turned up, so that the vane resembles a square cake tin. The vanes are preferably of aluminum.

An alternative vane structure would be a series of successive erect and inverted blunt cones, with the ultra-violet lamp running up the axis of the cones in the center of the tank 21, as shown and described in the application mentioned in the next paragraph.

The deaerating tank and its included parts are more particularly described and specifically claimed in the copending joint patent of Stedman B. Hoar and myself, No. 2,020,250, issued November 5, 1935.

The deaerated liquid gathers in the bottom of tank 21, whence it is led off by pipe 26, controlled by cock 27, into a vacuum bell 28.

The word "bottom" in this connection, and in the claims is not to be taken in the narrow sense of the absolute bottom of the tank, but rather means any portion of the tank below the normal minimum level of liquid therein.

The bell should be sufficiently lower than the tank, so that the bell will not have to be so completely exhausted as the tank, and yet permit free flow of the liquid from the tank to the bell. But there should not be too much air in the bell, or there will be an appreciable reaeration of the liquid. I have found in practice that a ten foot drop is excellent.

The base 29 of this bell is mounted on a pedestal 30, whereby it can be raised and lowered by any convenient means (not shown, and not forming an essential part of my invention). The gasket 31 on this base seals the bottom edge of the bell. Any overflow of liquid is caught in the trough 32, and is conveyed away in any appropriate manner.

A can rest 33 is provided with sidewardly projecting small holes 34, so that any sudden ingress of air will not upset the can or disturb its contents. The can rest also provides a place on which for the container to rest that will not fill with overflowed liquid and cause the container to be shaken by expanding air bubbles trapped beneath it.

In practice, an empty can 35, or a can partly packed with solids, is placed on the can rest 33. The bell is then closed by raising the pedestal 30. Air is then exhausted from the bell, to a sufficient degree so that liquid will flow by gravity from the tank 21. The tap 27 is then turned, and deaerated liquid is admitted to the can until it is filled. Air is then admitted to the bell, the pedestal is lowered, and the can is capped and taken to the sealer (not shown) which may be of any convenient and commercial form.

After capping and sealing, the can is pasteurized and cooled, as by the apparatus shown in the copending joint application of Stedman B. Hoar and myself, Serial No. 616,952, filed June 13, 1932, and by the process shown in the copending joint application of Stedman B. Hoar and myself, Serial No. 752,292, filed November 9, 1934.

Returning now to Figure 1 of the present application, we see that 36 is a flexible pipe leading from the can rest 33 to a pipe 37, which has a three-way valve 38. The function of this valve is to connect the pipe 37 selectively to pipe 39 leading to the open air, or pipe 40 leading through trap 41 to vacuum pump 42. This pump is preferably a motor driven Kinney pump and should be capable of exhausting to an absolute pressure preferably ½" Hg, or less.

This pump also serves to exhaust the deaerating tank 21 through pipe 43, in which 44 is an automatic one-way valve so set as to prevent any back pressure from entering the tank.

The use of the one-way valve, the three-way valve, and the trap, permits the use of a single pump to exhaust both the tank and the bell, thus saving the expense of a second pump.

47 is a temperature gauge, and 48 is a pressure gauge, which elements were implied in the parent case.

Turning now to Figure 2, we see that 45 is a tin can, and 46 is its terraced cover. It will be evident that, if such a can be filled full of deaerated liquid, and the cover be then applied, there will be, entrapped within the can, no air from which the deaerated liquid can reabsorb oxygen.

It is to be understood that any of the hereinabove described parts of my apparatus may be supplanted by some other mechanism which will accomplish the same step in my process, without departing from the spirit of my invention.

Turning now to the chart which forms Figure 3, we see that its abscissas represent pressure in inches of mercury, and that its ordinates represent temperatures in degrees Fahrenheit of the liquid being processed. This chart bears four plotted curves, as follows:

The curve labeled "Boiling point of water" is well-known. It represents the pressure-temperature combinations at which water will boil.

The curve labeled "Boiling point of orange juice" represents the pressure-temperature combinations at which the residual liquid in Valencia orange-juice will boil, after deaeration and complete loss of volatiles.

The curve labeled "Loss of volatiles" represents the pressure-temperature combinations at which maximum loss of the aromatic volatiles from citrus juices occurs. Although based upon experimentation, its location can at best be merely approximate.

The curve labeled "Total deaeration" represents the pressure-temperature combinations at which and to the left of which total deaeration is possible.

This phenomenon of the existence of a critical point of total deaeration was totally unpredictable, and in fact its non-existence was clearly indicated. Prior experimentation, with pressures attainable by ordinary commercial vacuum-pumps, indicated that total deaeration was attainable only at absolute zero pressure; except, of course, by raising the temperature to the boiling point. Boiling the liquid is obviously undesirable. Absolute zero is itself unattainable, and any near approach to it is commercially non-feasible. Accordingly prior art experimentors stopped off at pressures in the vicinity of 2" Hg, assuming that any further increase in vacuum would vary the percentage of extracted air only as a matter of degree.

Figure 4:
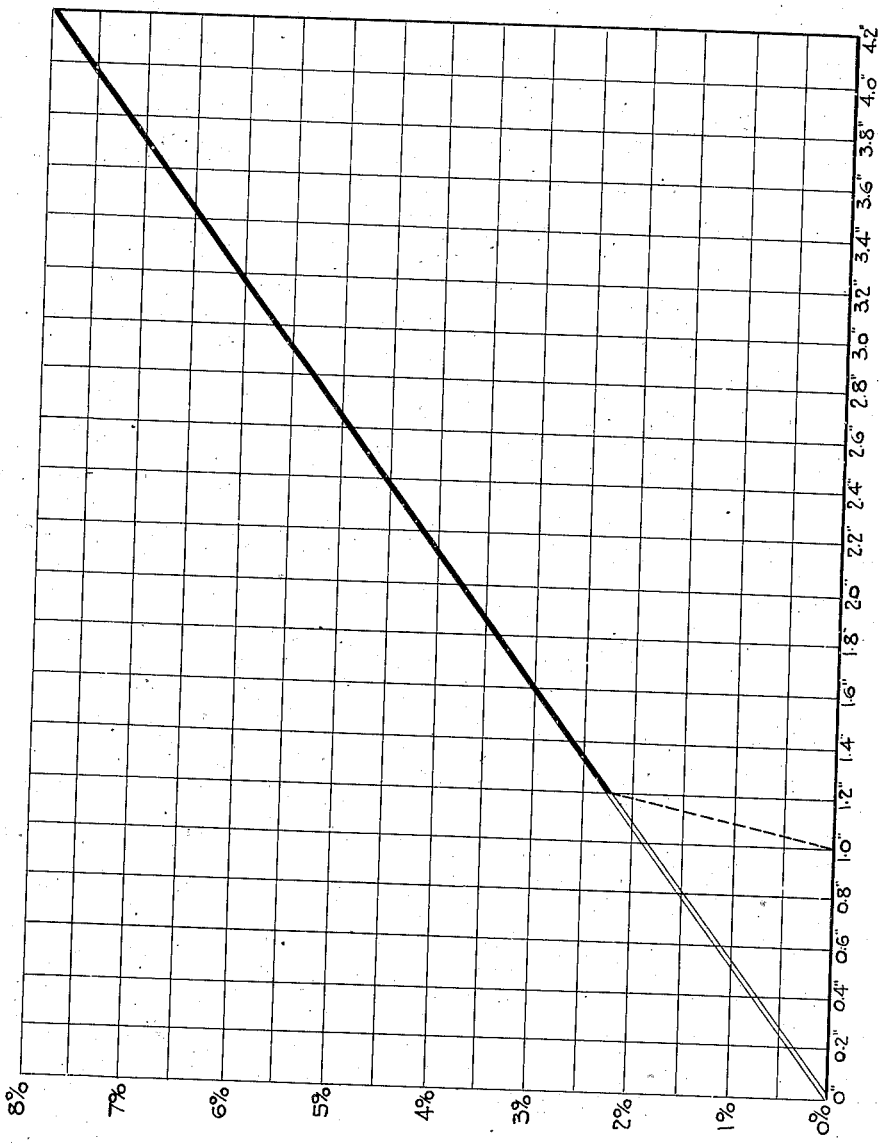

To illustrate the extreme plausibility of this prior art belief, I append the chart of Figure 4, in which the abscissas are pressure in inches of mercury, and the ordinates are percentage of remaining air (the quantity of air at atmospheric pressure being taken as 100). The experiment was performed on Valencia orange-juice at 60° Fahrenheit, under strict laboratory conditions, and confirms the conclusions of myself and associates based on much earlier commercial deaeration.

In Figure 4, the solid black line represents the asymptotically determined remaining air, which would remain after 100% efficient deaeration, at the pressure in question. This much of the curve lies within the range of pressures feasibly producible by the ordinary commercial vacuum pump (i. e., from 5" Hg to 2" Hg). The double line shows that this solid black curve would, if extrapolated, pass directly through the origin of coordinates; thus clearly indicating that complete deaeration is unattainable even in the laboratory, and that commercially it is not even approachable.

But the dotted line shows the true facts, namely that the actual curve, instead of following the predicted double line, takes a sudden drop, and crosses the X-axis almost vertically at 1" Hg.

Similar curves can be plotted for other juice-temperatures, and each will show a critical pressure of complete deaeration for that temperature. These critical temperature-pressure combinations have been collected to form the "Total deaeration" curve of Figure 3.

The "Total deaeration" curve, thus derived, is based upon experiments performed on Valencia orange juice of Brix 13°. Experiments with Valencia orange juice of other degrees of sweetness, and with grapefruit juice and navel orange juice, produce the same curve, and indicate that it is substantially applicable to other liquid food products.

Figures 3 illustrates the importance of precooling the juice well below 70° F., in order to have a wide enough range, between the Scylla of incomplete deaeration and the Charybdis of loss of volatiles and even boiling, so as to permit the fluctuations of pressure inevitably resulting from the fluctuations of juice-flow which are unavoidable in commercial practice.

The "Loss of volatiles" curve of Figure 3, although its exact nature has not yet been theoretically determined, is somewhat analogous to a boiling-point curve: that is to say, like the curve of boiling-point of water, it is preceded (to its right) by curves of various percentages of vapor that saturated air, extracted therefrom, can hold. These additional curves, although quantitatively derivable mathematically for water vapor, and although qualitatively known to exist for citrus juices and other liquid food products, are not quantitatively known with sufficient exactness in this connection, to plot them on Figure 3. Nor is this necessary. For, inasmuch as these water-vapor curves cross the line of total deaeration at a slant, and as the volatile line is even more inclined than the water boiling-point line, it follows that these curves of vaporization would cross the line of total deaeration at even more of a slant than the curves of vaporization of water.

Accordingly it follows that, the lower the temperature of the liquid, the less not only will be the danger of a boiling away of the volatiles due to a slight pressure-drop due to fluctuation in juice-flow, but also will be the less loss of volatiles due to vaporization of volatiles at the temperature-pressure combination in question. Hence the importance of precooling.

Commercial practice has verified these theoretical considerations. A number of years of commercial processing of various liquid food-products have incontrovertibly demonstrated that when we precooled we always retained volatiles which we always lost when we did not precool. This was demonstrated not only by the fact of the superior taste of precooled juice, but also by fact that water used as a condenser for the exhaust from our apparatus picked up substantial flavor from non-precooled liquid, and practically none from precooled liquid.

Also, if liquid which has been totally deaerated without precooling, and liquid which has been totally deaerated with precooling, are comparatively subjected to lower and lower pressures at any same temperature, the latter will first exhibit visual signs of boiling, thus indicating its retention of these volatiles which boil at a higher pressure than does the basic liquid.

A further reason for precooling is that, at lower temperatures, and the consequent lower pressures necessary to secure total deaeration, the inherent capacity limitations of even the best commercial pumps obtainable constitute a "buffer" against the fluctuation in juice-flow causing a pressure-drop dangerously close to the boiling-point.

There are two further reasons for precooling, and particularly for precooling to below 70° F. In the first place, due to the fluctuation of the natural air temperature during the orange season, precooling to somewhere near the lower limit of this fluctuation is advisable, so as to ensure uniformity of product. Secondly, chilling the juice immediately after extraction and then holding it chilled until processing has been completed, is advisable to retard the growth of organisms until they have been killed.

Both this consideration of retarding the growth of organisms, and the consideration securing a low enough pressure to attain complete deaeration without the danger of too great an additional pressure-drop, are considerably interlocked with the fact that the process set forth in this specification is continuous.

This process has enabled me to accomplish the deaeration of a minimum of 120 gallons of liquid per hour with vanes 24 of a size 24" long by 12" wide, and all other parts in proportion. It gives a continuous operation, taking about 15 seconds in deaerator 21. This is much more rapid than comparable batch operation.

In a continuous process, the constant flow of undeaerated liquid will keep furnishing air to occupy the capacity of the pump, and thus tend to prevent the inevitable drop of pressure toward the boiling-point, which would occur in a batch system, upon completion of deaeration.

In the claims, wherever equations are given, "T" will represent the temperature in degrees Fahrenheit, and "P" the pressure in inches of mercury.

The equation for the curve of complete deaeration is:

$$P = 0.02T - 0.2$$

The curve of boiling point of water, calculated from already-known data is:

$$P = 0.3954 - 0.015375T + 0.0002909T^2$$

This equation is sufficiently close for all practical purposes within the range with which the present problem is concerned.

The curve of the boiling point of orange juice has been empirically determined to be very closely approximated by the following equation:

$$P = 0.7650 - 0.0305T + 0.0004T^2$$

In the claims, all temperatures are given in degrees Fahrenheit.

In the claims the term "simple deaeration" will be used, for brevity, to mean the removal of dissolved, occluded and entrained air by the use of vacuum, without the substitution of any other gas.

Having now described and illustrated one form of my apparatus, I wish it to be understood that my invention is not to be limited to the specific form or arrangement of parts hereinbefore described, except in so far as such limitations are specified in the appended claims.

I claim:

1. In a method for deaerating a liquid food product, the step which consists in continuously filming the liquid through a vacuum chamber wherein there is maintained a pressure between $P = 0.02T - 0.2$ (in which P is the pressure within the chamber in inches of mercury, and T is the temperature Fahrenheit of the liquid), and the maximum pressure at which boiling of the liquid occurs at said temperature.

2. In a method for deaerating a liquid food product, the step which consists in continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said temperature being below 70°, and therein maintaining the air-containing liquid in a state of substantial surface exposure.

3. In a method for deaerating a liquid food product, the step which consists in continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said pressure being a vacuum of more than 29 inches of mercury, and therein maintaining the air-containing liquid in a state of substantial surface exposure.

4. In a method for deaerating a liquid food product, the step which consists in continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said temperature being below 70°, and said pressure being a vacuum of more than 29 inches of mercury, and therein maintaining the air-containing liquid in a state of substantial surface exposure.

5. In a method of deaerating a liquid food product, the steps which consist in first precooling the liquid, and then continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said temperature being below 70°, and therein maintaining the air-containing liquid in a state of substantial surface exposure.

6. In a method of deaerating a liquid food product, the steps which consist in first precooling the liquid, and then continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said pressure being a vacuum of more than 29 inches mercury, and therein maintaining the air-containing liquid in a state of substantial surface exposure.

7. In a method of deaerating a liquid food product, the steps which consist in first precooling the liquid, and then continuously introducing the liquid into a vacuum chamber wherein there is maintained a pressure at or below $P = 0.02T - 0.2$, in which P is the pressure within the chamber in inches of mercury, and T is the temperature Fahrenheit of the liquid, said temperature being below 70°, and said pressure being a vacuum of more than 29 inches of mercury, and therein maintaining the air-containing liquid in a state of substantial surface exposure.

8. In a method for deaerating a liquid food product, the steps which consist in continuously introducing the liquid into a vacuum chamber wherein there is maintained a pressure at or below $P = 0.02T - 0.2$ (in which P is the pressure within the chamber in inches of mercury, and T is the temperature Fahrenheit of the liquid); and therein maintaining the air-containing liquid in a state of substantial surface exposure without boiling.

9. In a method for deaerating a liquid food product, the steps which consist in continuously introducing the liquid into a vacuum chamber wherein there is maintained a pressure between $P = 0.02T - 0.2$ (in which P is the pressure within the chamber in inches of mercury, and T is the temperature Fahrenheit of the liquid) and the maximum pressure at which boiling of the liquid occurs at said temperature; and therein maintaining the air-containing liquid in a state of constant surface exposure.

10. In a method for deaerating a liquid food product, the steps which consist in first precooling the liquid and then continuously introducing the liquid into a vacuum chamber wherein there is maintained a pressure between $P = 0.02T - 0.2$ (in which P is the pressure within the chamber in inches of mercury, and T is the temperature Fahrenheit of the liquid) and the maximum pressure at which boiling of the liquid occurs at said temperature; and therein maintaining the air-containing liquid in a state of constant surface exposure.

11. In an apparatus for continuously processing liquid food products, the combination of: a liquid reservoir; means for precooling the liquid; a conduit joining these two elements; a vacuum chamber containing means for maintaining the air-containing liquid in a state of substantial surface exposure; a conduit joining the precooling means to the chamber; means for exhausting the chamber to below the critical pressure at which complete simple deaeration of the liquid is possible at its temperature; and an exit conduit from this chamber.

12. In a method for deaerating a liquid food product, the steps which consist in continuously introducing the liquid into a vacuum chamber wherein there is maintained a pressure at or below the critical pressure at which complete simple deaeration of the liquid is possible at the temperature of the liquid, and therein maintaining the air-containing liquid in a state of substantial surface exposure.

13. In a method for deaerating a liquid food product, the steps which consist in continuously introducing the liquid into a vacuum chamber wherein there is maintained a pressure between the critical pressure at which complete simple deaeration of the liquid is possible at the temperature of the liquid and the maximum pressure at which boiling of the liquid would occur at the temperature of the liquid, and therein maintaining the air-containing liquid in a state of substantial surface exposure.

14. In a method for deaerating a liquid food product, the steps which consist in first precooling the liquid, and then continuously introducing the liquid into a vacuum chamber wherein there is maintained a pressure at or below the critical pressure at which complete simple deaeration of the liquid is possible at the precooled temperature of the liquid, and therein maintaining the air-containing liquid in a state of substantial surface exposure.

HENRY C. STEPHENS.